United States Patent

Byun

[19]

[11] Patent Number: 5,982,706
[45] Date of Patent: Nov. 9, 1999

[54] METHOD AND SYSTEM FOR DETERMINING NORMAL MOVEOUT PARAMETERS FOR LONG OFFSET SEISMIC SURVEY SIGNALS

[75] Inventor: Bok S. Byun, Plano, Tex.

[73] Assignee: Atlantic Richfield Company, Los Angeles, Calif.

[21] Appl. No.: 08/810,455

[22] Filed: Mar. 4, 1997

[51] Int. Cl.$^6$ ..................................................... G01V 1/36
[52] U.S. Cl. ................................ 367/52; 367/21; 367/52; 367/45; 367/43
[58] Field of Search .................................. 367/52, 59, 53, 367/36, 38, 21, 45, 43, 75; 340/15.5

[56] References Cited

U.S. PATENT DOCUMENTS

| | | | |
|---|---|---|---|
| 3,648,227 | 3/1972 | Sengbush | 340/15.5 |
| 4,789,969 | 12/1988 | Naville | 367/36 |
| 4,933,913 | 6/1990 | Thomsen | 367/36 |
| 4,980,866 | 12/1990 | Wang et al. | 367/52 |
| 5,128,899 | 7/1992 | Boyd et al. | 367/38 |
| 5,684,754 | 11/1997 | Byun et al. | 367/52 |
| 5,808,964 | 9/1998 | Lailly et al. | 367/53 |

OTHER PUBLICATIONS

Grechka and Tsvankin, "Feasibility of nonhyperbolic moveout inversion in traversely isotropic media"Colorado School of mines CWP Report (1996) pp. 269 et seq.

Hake, et al., "Three–Term Taylor Series for $t^2$—$x^2$ Curves of P–and S–Waves Over Layered Transversely Isotropic Ground", *Geophysical Prospecting,* vol. 32 (1984), pp. 828–850.

Buyn, et al., "Transversely isotropic velocity analysis for lithology discrimination", *Geoexploration,* vol. 28 (1991), pp. 269–292.

Tsvankin, et al., "Nonhyperbolic reflection moveout in anisotropic media", *Geophysics,* vol. 59, No. 8 (Aug. 1994), pp. 1290–1304.

*Primary Examiner*—Christine Oda
*Assistant Examiner*—Anthony Jolly
*Attorney, Agent, or Firm*—Anderson, Levine & Lintel

[57] ABSTRACT

A method and computer system for deriving and applying normal moveout corrections to seismic survey traces is disclosed. In each common midpoint (CMP) gather, a stacking velocity function of travel time is first determined for near-offset traces. For each reflective event, a time window about a depth point is selected. Time anisotropy and velocity anisotropy values are then determined for the depth point, for example by way of a semblance analysis applied to envelopes of the traces over the full offset range. Normal moveout corrections are then determined by a weighted sum expression of travel time (zero-offset time plus moveout correction) The weighted sum adds a first travel time expression corresponding to a Dix equation expression with a second travel time expression corresponding to a skewed hyperbolic expression that includes the time and velocity anisotropy values, with the weighting dependent upon the offset of the particular trace. Near-offset traces receive relatively higher weighting of the Dix equation expression, while far-offset traces receive relatively higher weighting of the skewed hyperbolic expression. Because higher order power expressions are eliminated according to this approach, improved moveout correction accuracy is obtained over near and far offsets, with reduced sensitivity to measurement error.

21 Claims, 8 Drawing Sheets

(2 of 8 Drawing Sheet(s) Filed in Color)

METHOD AND SYSTEM FOR DETERMINING NORMAL MOVEOUT PARAMETERS FOR LONG OFFSET SEISMIC SURVEY SIGNALS

BACKGROUND OF THE INVENTION

This invention is in the field of seismic prospecting, and is more specifically directed to the analysis of seismic survey signals obtained in such exploration.

The use of seismic survey techniques is commonplace in the prospecting for subsurface reservoirs of hydrocarbons such as oil and gas. As is fundamental in the art, seismic surveys are typically obtained by imparting acoustic energy into the earth, either at a land surface or into the water in a marine survey, and detecting the energy at other surface or marine locations away from the source. The detectors sense the arrival of the acoustic energy after reflection from subsurface strata and interfaces, such that the time delay between the imparting of energy by the source and its receipt by the detectors will be indicative of the depth below the earth surface at which the reflecting interface is located. Conversion of the time-domain reflection signals into depth will thus provide a survey of the subsurface geology.

FIG. 1 illustrates a conventional land-based seismic survey in a portion of the earth having multiple subsurface strata 2, 4, 6, 8. In the example of FIG. 1, a reflective geological interface is present in the earth between subsurface strata 6,8 along which a particular depth point DP of interest for this description is located. Of course, many depth points, both along the interface between strata 6,8 and also from other interfaces in the region, will be analyzed in a typical survey.

In the typical land-based seismic survey, an array of receivers are deployed at the surface of the earth, and acoustic energy is imparted into the earth at varying surface source locations; in the typical marine seismic survey, the seismic source is towed by a vessel and activated at selected locations, and the receivers are either deployed in the water at fixed locations or are also towed by the source vessel. In either survey, the imparted energy is reflected from interfaces between subsurface strata, and this reflected energy is detected by the receivers in the array. In the simplified land-based example of FIG. 1, acoustic energy is reflected from depth point DP along multiple source-receiver paths that have varying angles of reflection at depth point DP. As such, the reflected energy is detected at receiver locations that have varying offset distances from the vertical, "zero-offset", path above depth point DP. The so-called "zero-offset" location is the surface location which is directly above depth point DP (i.e., the zero-offset location is the location at which reflected energy from depth point DP would reflect back to the source location). Typically, a zero-offset signal is not actually obtained in a survey, but is instead extrapolated from the other traces of varying offset.

Two source-receiver paths $P_n$, $P_f$ are illustrated in the simplified example of FIG. 1. Near-offset path $P_n$ corresponds to energy imparted at source location $S_n$ and detected by receiver $R_n$ after being reflected from depth point DP, while far-offset path $P_f$ corresponds to energy imparted at source location $S_f$ and detected by receiver $R_f$, also after reflection from depth point DP. The offset distances of paths $P_n$, $P_f$ are illustrated in FIG. 1 as offsets $x_n$, $x_f$, respectively. Because the overall length of far-offset path $P_f$ is significantly greater than that of near-offset path $P_n$, the travel time of acoustic energy along far-offset path $P_f$ is much greater than that along near-offset path $P_n$, despite the paths having a common depth point DP.

A well-known technique in the art for eliminating random noise from the survey signals is referred to as common midpoint (CMP), or common depth point (CDP), gather and stack. In this technique, the signals from each source-receiver path having the same depth point are selected from the survey data, forming a group of traces known as a CMP (or, equivalently, CDP) gather. Elimination of random noise is then performed by summing the traces in the gather into a "stack". This summation will tend to reinforce the signal portion of the traces corresponding to the reflection event, which should be common among all traces having the same reflection midpoint, while the random noise will tend to cancel in the summation.

As noted above for the example of FIG. 1, in the CMP gather for depth point $DP_i$, the seismic traces detected by receivers $R_n$, $R_f$ will have different reflection times for energy reflected from the same reflection point DP, because their paths $P_n$, $P_f$ are of different length. Specifically, the time at which energy reflected from depth point DP will appear in the trace for receiver $R_f$ will be later than the time at which energy reflected from depth point DP will appear in the trace for receiver $R_n$. This time-delay effect of varying offset must be taken into account in the CMP stack process in order for the signal portions of traces of varying offset to properly align and provide an accurate indication of the depth of the reflector. This is typically handled by way of "normal moveout correction", or NMO (also NMOC), in which the traces corresponding to source-receiver paths of various lengths are time-shifted relative to one another so that their detected reflection events are aligned in time. The amount of the time shift for a given trace will, of course, depend upon its offset distance and upon the velocity with which the acoustic energy travels in the strata along the shot-receiver path. Normal moveout correction therefore requires the estimation or determination of a velocity, commonly referred to as the "stacking" velocity, for deriving the necessary time shift as a function of offset.

By way of further background, another well-known survey approach is commonly referred to as vertical seismic prospecting (VSP). In a VSP survey, energy is imparted into the earth from subsurface locations within a wellbore, and detected at surface detectors. The time delay between the imparting of energy by the wellbore source and its receipt by the surface detectors, in the VSP survey, will be indicative of attributes, such as acoustic velocities, of the subsurface strata, and may also be indicative of discontinuities and interfaces among the various strata. Of course, similarly as in the case of the surface-source seismic survey, the offset distance between the wellbore and the surface detectors will directly affect the time delay at which acoustic energy is detected at the surface. As such, normal moveout corrections are also necessary to process seismic signals obtained in VSP surveys. For purposes of clarity, the following discussion will refer to the conventional surface-based source seismic surveys, it being understood that similar concerns are applicable for moveout correction in VSP surveys.

In the ideal geological situation of a homogenous and isotropic medium, the wave surface of the acoustic energy imparted into the earth is spherical. Assuming reflection of the spherical wave surface from a horizontal reflecting surface in this ideal case, the relationship between arrival time t of the energy at a given surface detector R, and the offset distance x of detector R corresponds to a centered hyperbola; the relationship between offset distance x and travel time t is thus a straight line in the $t^2$ versus $x^2$ domain. The NMO time correction $\Delta t_x$ for a given seismic reflection event in a seismic trace may be derived according to the well-known Dix equation:

$$t^2 = (t_0 + \Delta t_X)^2 = t_0^2 + \frac{x^2}{V_v^2}$$

where $t_0$ is the zero offset reflection time of a given reflection, where x is the offset distance of the trace to be corrected, and where $V_v$ is the acoustic velocity in the homogeneous isotropic medium. Solving this relationship for $\Delta t_x$ will produce the NMO time shift for the reflection event in the trace being corrected. In practice, the stacking velocity $V_v$ is typically determined as a root-mean-square velocity, or as a best-fit average velocity by way of a semblance analysis or other technique, to account for the multiple strata (e.g., strata 2, 4, 6 in the example of FIG. 1) through which the acoustic energy travels.

As noted above, the Dix equation hyperbola assumes the ideal condition of isotropic velocity in a homogenous medium. In practice, however, the subsurface of the earth often exhibits variations in velocity that depend upon the angle of propagation of the acoustic energy from the vertical, zero-offset, axis. In particular, the horizontal ray velocity ($V_h$) generally differs from the vertical ray velocity ($V_v$) along the zero-offset path. These effect of these variations, which is commonly referred to in the art as transverse isotropy, is due to the heterogeneity of velocities among the subsurface strata in the survey, and also to the anisotropic response of the earth to acoustic energy. Physical factors that cause anisotropic response include preferential orientation of rock properties, such as in sedimentary rocks with aligned crystals and sand grains, and also rocks with directional microcracks induced by regional stress fields. A simple modification of the Dix hyperbolic equation accounts for differences between the vertical and horizontal ray velocities $V_v$, $V_h$, respectively, as follows:

$$t^2 = \left(\frac{z}{V_v}\right)^2 + \left(\frac{x}{V_h}\right)^2$$

This expression of the Dix equation corresponds to an elliptical wave surface of acoustic energy traveling through the earth, with different velocity components in the vertical and horizontal directions.

The propagation of long-wavelength acoustic energy has been observed to exhibit apparent transverse isotropy in stratified regions of the earth, even in cases where each layer in the stratified region is itself individually isotropic. This apparent transverse isotropy is due to the dominance, at long offsets, of high velocity layers in the travel time of acoustic energy through multiple layers in the region, which causes the apparent horizontal velocity to be higher than the zero-offset, vertical, velocity. Sedimentary rocks that are formed through sand-shale stratification and other cyclic sedimentation processes typically exhibit transverse isotropy. In transversely isotropic regions, the accuracy of the Dix equation is practically limited to relatively short offset distances, such as offsets ranging up to on the order of the depth of the reflecting interface. For example, referring to FIG. 1, each of paths $P_n$, $P_f$ pass through multiple strata 2, 4, 6. While the acoustic velocities are uniform within each of strata 2, 4, 6, the relative distances traversed by each path $P_n$, $P_f$ vary with increasing offset distance. Therefore, even assuming that strata 2, 4, 6 are each individually transversely isotropic (i.e., having the same acoustic velocity in all horizontal directions therewithin), the stacking velocity will typically not be constant over the range of offsets obtained in the survey. Accordingly, the Dix equation hyperbolic assumption remains valid only over near-offset traces, as the time-distance relationship is no longer hyperbolic at large offsets in vertically anisotropic regions, such as those including transversely isotropic strata as shown in FIG. 1.

An example of the skewing of the horizontal velocity in transversely isotropic regions is illustrated in the plot of FIG. 2. FIG. 2 is a plot of vertical velocity $V_v$ versus horizontal velocity $V_h$, illustrating the elliptical wavefront of acoustic energy, according to the Dix equation modified to incorporate different horizontal and vertical velocities $V_v$, $V_h$, as described above. In FIG. 2, ellipse $E_d$ is a plot of the wavefront of acoustic energy in accordance with the Dix equation, using the hyperbolic assumption described hereinabove. In this example, a horizontal velocity $V_{he}$ is estimated from the Dix equation. Skewed ellipse $E_s$ illustrates the actual horizontal velocity $V_{ha}$ that occurs in transversely isotropic media. As illustrated in FIG. 2, the actual horizontal velocity $V_{ha}$ is slightly larger than that estimated from the Dix equation according to the hyperbolic assumption. This discrepancy from the Dix equation will be most evident in far-offset traces, of course, considering the longer path distances presented therein. Accordingly, use of the Dix equation in conventional normal moveout processing is therefore not adequate to derive accurate normal moveout correction values for far-offset data in transversely isotropic regions, due to the discrepancy between the actual horizontal velocity and that which would be applied through solution of the Dix equation using conventional methods.

Conventional approaches for determining normal moveout corrections for far-offset seismic traces in transversely isotropic media are known. One approach utilizes a truncated Taylor series expansion to model the $t^2$–$x^2$ relationship in the survey region. As described in Hake et al., "Three-term Taylor Series for $t^2$–$x^2$ Curves of P- and S-Waves over Layered Transversely Isotropic Ground", *Geophysical Prospecting* 32 (1984), pp. 828–850, a three-term Taylor series expansion of $t^2$ as a function of $x^2$ may be used to calculate the elastic parameters of the transversely isotropic media. Quartic Taylor series expansion, using exact coefficients, has also been applied to the transversely isotropic layered media problem, as described in Tsvankin, et al., "Nonhyperbolic reflection moveout in anisotropic media", *Geophysics*, Vol. 59, No. 8 (August 1994), pp. 1290–1304.

The truncated Taylor series expansion has been successful in deriving nonhyperbolic moveout correction for long-offset reflection seismic data, particularly in improving the results of CMP stacking to improve the image of reflection signals. However, it is also desirable to derive estimates of the anisotropy parameters from the moveout analysis, to permit inversion of subsurface parameters that are indicative of the nature of the various strata in the survey region. It has been found, in connection with the present invention, that truncated Taylor series analysis is not well-suited for subsurface parameter inversion, because of the sensitivity of the Taylor series coefficients to measurement errors. The heightened error sensitivity is primarily due to the higher order (third order and higher) terms used in the Taylor series analysis.

By way of further background, another approach toward estimation of stiffness coefficients for multiple transversely isotropic layers in a seismic survey region is described in Byun et al., "Transversely isotropic velocity analysis for lithology discrimination", *Geoexploration* 28 (Elsevier Science Publishers B. V., 1991), pp. 269–292, incorporated herein by this reference. According to this approach, a skewed hyperbolic moveout formula is applied to pressure waves to derive three measurement parameters which, when combined with two shear wave measurement parameters, enable inversion for the five stiffness coefficients by way of a model-iterative optimization scheme.

BRIEF SUMMARY OF THE INVENTION

The present invention may be implemented into a computer system and method of operating the same by determining a near-offset stacking velocity at a common depth point in a gather of seismic traces. First and second anisotropy values for this common depth point are then determined based at least upon traces having offset distances greater than a threshold distance. A normal moveout correction for each seismic trace in the gather is the determined for the common depth point, from a weighted sum of a first offset-dependent normal moveout factor that is dependent upon the near-offset stacking velocity and not dependent upon the first and second anisotropy values and a second offset-dependent normal moveout factor that is dependent upon the first and second anisotropy values. Corrections are similarly determined for each depth point in the gather, and over multiple gathers in the survey as desired. The used of the weighted sum of the first and second offset-dependent normal moveout factors avoids higher-order (third order and above) terms, thus reducing sensitivity to measurement error.

BRIEF DESCRIPTION OF THE SEVERAL VIEWS OF THE DRAWING

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
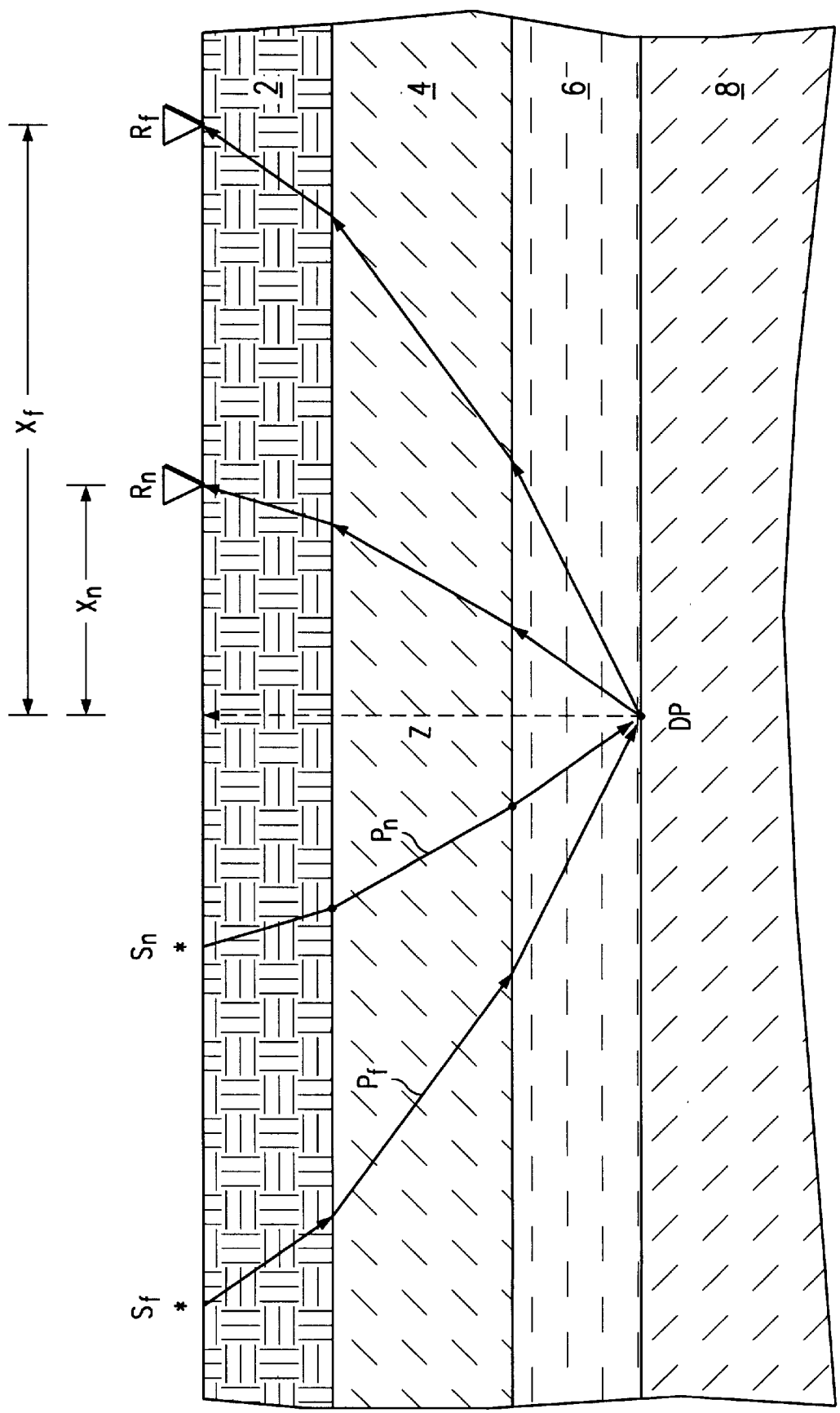
FIG. 1 is a cross-sectional view of a portion of the earth illustrating the acquisition of seismic survey signals in a conventional manner.
Figure 2:
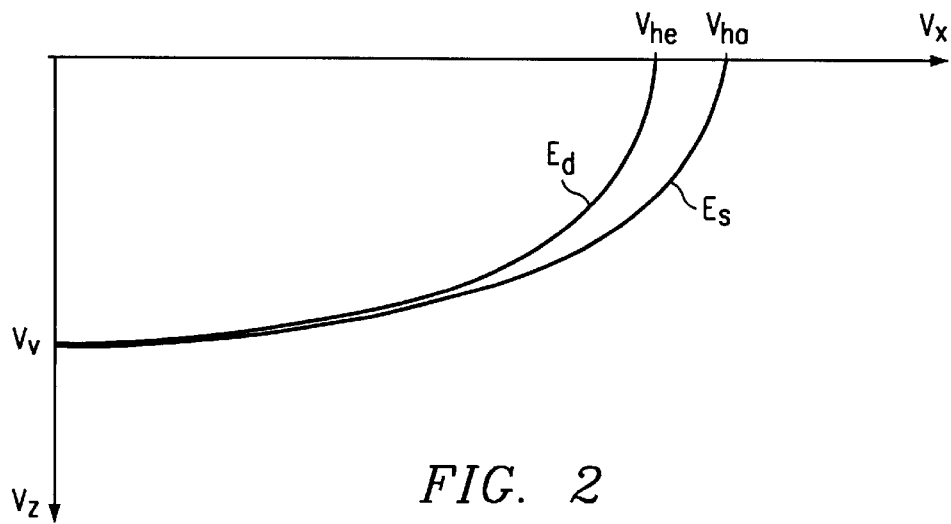
FIG. 2 is a plot of vertical and horizontal ray velocities, illustrating the deviation of observed horizontal velocity from that predicted by the hyperbolic assumption used in the Dix equation.

As will be evident from the following description, the present invention is applicable to seismic survey signals that are acquired in the conventional manner from either land-based or marine surveys. As is well known according to the art, seismic surveys may be of the two-dimensional (2-D) type, in which the seismic source is incrementally moved along a line that is parallel from a line of receivers, to obtain survey signals corresponding to a line of midpoints. Three-dimensional (3-D) surveys are also well known in the art, and are obtained through use of at least one array of receivers arranged in multiple parallel lines, with source energy imparted at varying locations and varying offsets from the arrays of receivers. It is contemplated that those of ordinary skill in the art are familiar with conventional techniques of data acquisition in seismic surveys of the 2-D and 3-D type, in both the marine and land environments. In addition, vertical seismic profiling (VSP) is a well-known technique for gathering information about geological formations. According to the VSP approach, a seismic source is actuated by a tool placed within the wellbore, at varying depths; receivers are deployed at various locations at the surface of the earth to receive the energy imparted by the downhole source, with the time delay indicative of the acoustic velocities in the earth. VSP is typically used to correlate previously obtained seismic surveys to the conditions actually encountered at the well, and for characterization of the subsurface strata in the vicinity of the well. While the preferred embodiment of the present invention will be described relative to 2-D land-based surveys obtained with surface-deployed source and receivers, those of skill in the art will readily comprehend that the present invention is also applicable to marine surveys, to 3-D seismic surveys, and to VSP surveys.

For purposes of clarity of description of the preferred embodiment of the present invention, the theoretical background of the present invention will first be described. As noted above, the well-known Dix equation relates the source-receiver travel time t of energy through an isotropic homogeneous medium, as a function of the zero-offset travel time $t_0$ and the offset distance x of a receiver from the zero-offset path as follows:

$$t^2 = t_0^2 + \frac{x^2}{V_v^2}$$

where $V_v$ is the vertical acoustic velocity within the medium (which, given the isotropic assumption, equals the horizontal moveout velocity). In the case of a surface-deployed source and receiver survey, the travel times t, $t_0$ are two-way times from source to reflective depth point to receiver, while in VSP surveys, the travel times t, $t_0$ are one-way times from the downhole source to the surface receiver; for purposes of this description, the "depth point" will refer to the reflective depth point in the surface-deployed survey, and to the source location in a VSP survey. As described hereinabove, travel time t represents the sum of the zero-offset time $t_0$ with the appropriate normal moveout correction $\Delta t_x$. The application of the Dix equation to actual survey regions is necessarily limited to near-offset traces, where the path of the acoustic energy from the depth point to the offset surface location is substantially vertical. For practical purposes, the near-offset region is typically defined as that where the offset distance x is less than the depth z of the depth point below the surface (see FIG. 1).

The above-incorporated Byun et al. article, "Transversely isotropic velocity analysis for lithology discrimination", *Geoexploration* 28 (Elsevier Science Publishers B. V., 1991), pp. 269–292, describes a relationship between the travel time t and the offset distance x for far-offset traces, specifically those where the offset distance x is greater than the depth z of the depth point. This relationship uses three velocities, namely the vertical ray velocity $V_v$ (which effectively corresponds to the near-offset stacking velocity), the horizontal ray velocity $V_h$, and a skew velocity $V_\gamma$ that is indicative of the characteristic of the ray velocity for directions between the vertical and horizontal directions. As described in the above-incorporated Byun et al. article, the velocities $V_h$, $V_v$, $V_\gamma$ may be derived from an approximation of the ray velocity as a function of the angle $\phi$ at which the acoustic energy travels to a surface location from the depth point, expressed as a truncated Fourier series as follows:

$$V^{-2}(\phi) = a^2 + b^2 \cos^2\phi - c^2 \cos^4\phi$$

This expression has been observed to be a good approximation in a so-called "weakly anisotropic" medium. The Fourier coefficients a, b, c are representative of the medium. Specifically, b=c=0 in a homogeneous isotropic medium, while c=0 in an elliptically anisotropic medium. In this approximation, the vertical, horizontal, and skew velocities $V_v$, $V_h$, $V_\gamma$, respectively, may be expressed as:

$$V_v = \frac{1}{\sqrt{a^2 + b^2}}$$

$$V_h = \frac{1}{a}$$

$$V_\gamma = \frac{1}{\sqrt{a^2 + c^2}}$$

For long offsets, according to this approximation, the square of the travel time t according to this approach may be expressed as:

$$t^2 = t_0^2 \left[1 + \left(\frac{V_v}{V_\gamma}\right)^2\right] + \left[\frac{x}{V_h}\right]^2$$

This expression will be referred to herein as the "skewed hyperbola" expression, considering that the skew velocity $V_\gamma$, which relates to the degree of skewness of the hyperbolic assumption, is incorporated into the travel time expression. Attention is directed to Appendix A of the above-incorporated Byun et al. article for derivation of these relationships.

According to the preferred embodiment of the present invention, the far-offset expression for the travel time t may be expressed more simply, and in a more applicable fashion relative to the implementation of the preferred embodiment of the invention described hereinbelow, through use of a time anisotropy factor $\alpha$ and a velocity anisotropy factor $\beta$, defined as follows:

$$\alpha = \sqrt{1 + \left(\frac{V_v}{V_\gamma}\right)^2}$$

$$\beta = \frac{V_h}{V_v}$$

Using the anisotropy factor $\alpha, \beta$ so defined, the travel time t in the long-offset case may be expressed as:

$$t^2 = (\alpha t_0)^2 + \left[\frac{x}{\beta V_v}\right]^2$$

In the case where the anisotropy factor $\alpha, \beta$ both equal unity (i.e., no anisotropy), the travel time expression is reduced to the Dix equation.

According to the preferred embodiment of the invention, as will become even more apparent from the following description, a weighted sum of the near-offset and far-offset expressions for travel time t is used, where the weighting depends upon the offset distance x. In short, for near-offset traces (x small), the Dix equation is more heavily weighted, while the expression including the time and velocity anisotropy factors $\alpha, \beta$, respectively, is more heavily weighted for larger x. According to the preferred embodiment of the present invention, this weighted sum approach is expressed as follows:

$$t^2 = w(x) \sqrt{\left(t_0^2 + \left[\frac{x}{V_v}\right]^2\right)} + (1 - w(x)) \sqrt{(\alpha t_0)^2 + \left[\frac{x}{\beta V_v}\right]^2}$$

where w(x) is a monotonically decreasing function of offset x, ranging from one (at x=0) to zero (at x=∞). An example of the function w(x) that is useful in connection with the preferred embodiment of the invention is:

$$w(x) = \exp\left(\frac{-x^2}{x_c^2}\right)$$

where $x_c$ is a threshold offset distance that varies with the zero-offset travel time $t_0$, in a relationship that depends upon the geology of the survey region, and may be experimentally or empirically determined. Typically, the value of $x_c$ will be on the order of the depth z of the depth point (i.e., on the order of $\frac{1}{2} t_0 V_v$ in the case where t0 is a two-way time, or on the order of $t_0 V_v$ for VSP surveys). Of course, other monotonically decreasing functions w(x) may alternatively be used to derive the weighted sum expression for travel time t as presented hereinabove.

According to the preferred embodiment of the invention, therefore, the expression for the square of the travel time t to a receiver location of offset x substantially follows the Dix equation hyperbolic assumption for near-offset traces, substantially follows the skewed hyperbolic approach described in the Byun et al. article for far-offset traces, and follows a combination of the two for medium-offset traces (at values of offset x of on the order of the depth z of the reflective point, or source point in the case of a VSP survey). As a result, normal moveout corrections may be derived that are highly accurate in transversely isotropic regions, such as encountered in many stratified sand and shale regions of the earth that are of importance in hydrocarbon prospecting. In addition, the travel time expression for far-offset traces as described hereinabove does not include any terms of higher than second order, thus reducing the sensitivity of the normal moveout determination to measurement error, from that present in conventional methods such as truncated Taylor series expressions.

Figure 3:
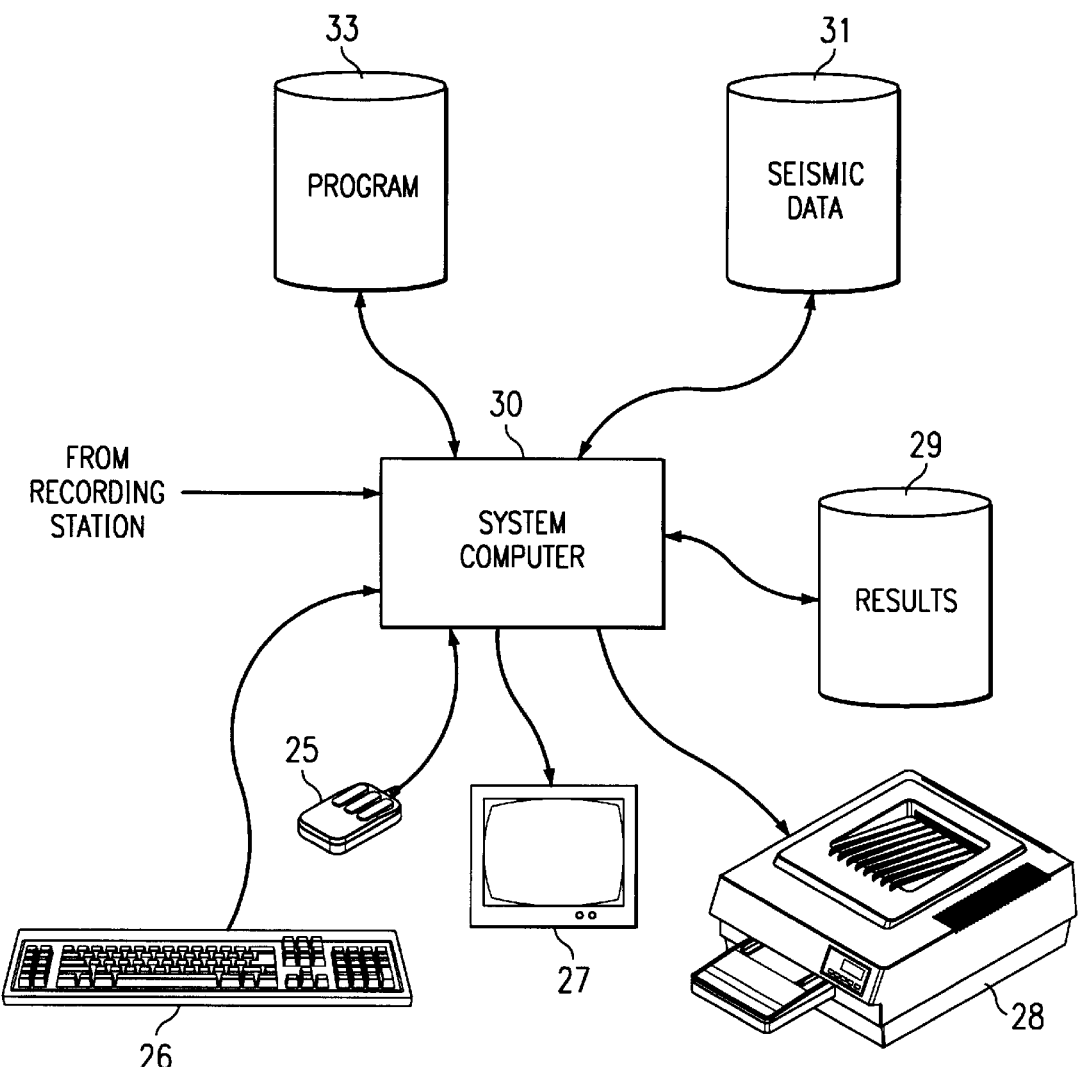
FIG. 3 is an electrical diagram, in block form, of a computer system into which the preferred embodiment of the invention may be implemented.

Referring now to FIG. 3, a computer system into which the preferred embodiment of the invention may be implemented will be described. This system includes system computer 30, which may be implemented as any conventional personal computer or workstation, for example a SPARCstation available from Sun Microsystems Inc., either in standalone fashion or as part of a network. System computer 30 is in communication with disk storage devices 29, 31, and 33, which are preferably external hard disk storage devices but which alternatively be of any conventional type used for the storage of computer programs and data, including hard disk drives, floppy disk drives, drives for CD-ROMs and other optical media, drives for magnetic tape and other magnetic media, and the like. It is contemplated that disk storage devices 29, 31, 33 may be either directly connected to system computer 30, or indirectly accessible by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from a recording station, such as may be in situ at the survey locations, are received by system computer 30 and, after conventional formatting and other initial processing, stored on disk storage device 31. System computer 30 will then retrieve the appropriate data from disk storage device 31 in order to perform the processing described hereinbelow. This operation by system computer 30 is controlled by a sequence of program instructions, written in the form of a computer program (e.g., in C++ or in another suitable language) and stored in computer-readable memory, such as program disk storage device 33 of FIG. 3; of course, the memory medium storing the computer program may be of any conventional type used for the storage of computer programs, including hard magnetic disk, floppy disks, CD-ROMs and other optical media, magnetic tape and other magnetic media, and the like.

According to the preferred embodiment of the invention, system computer 30 presents output onto graphics display 27, or alternatively via printer 28; further in the alternative, system computer 30 may store the results of the analysis described hereinbelow on disk storage device 29, for use in further analysis. Keyboard 26 and pointing device 25 (e.g., a mouse, trackball, or the like) are provided with system computer 30 to enable interactive operation. As noted, system computer 30 is able to communicate with disk storage devices 29, 31, 33 in the conventional manner, depending upon the particular implementation. System computer 30 is typically located at a data center remote from the survey region.

According to the preferred embodiment of the invention, a method of operating the computer system of FIG. 3 to correct seismic signals detected in a conventional seismic survey for offset-dependent time delays, in surveys of either the 2-D or 3-D type and performed in either a marine or land-based setting, will now be described relative to FIG. 4. As noted above, while the preferred embodiment of the invention will be described relative to a surface-deployed survey, those of ordinary skill in the art will recognize from the following description that the preferred embodiment of the invention may readily be applied to VSP surveys and other similar surveys.

The method according to the preferred embodiment of the invention begins with process 32, in which system computer 30 retrieves, from memory such as disk storage device 31, digital data corresponding to a group of traces having a common midpoint; accordingly, the traces retrieved in process 32 are referred to as a common midpoint (CMP) gather. An example of a CMP gather would be the traces detected by a group of receivers including receivers $R_n$ and $R_f$ in response to energy imparted at a corresponding group of source locations including sources $S_n$ and $S_f$ illustrated in FIG. 1. Of course, the number of source-receiver paths P will be much larger than the two illustrated by way of example in FIG. 1, as it is contemplated that the number of individual traces in a typical CMP gather may range from 120 to 240, with offset distances x typically ranging from 3000 to 5000 meters in modern surveys, depending upon the depth of the target reflector. Since the system of FIG. 3 operates upon discrete digital data, the traces retrieved in process 32 are sequences of discrete values. However, for purposes of the present description, the traces retrieved in process 32 will be referred to as time-domain seismic traces, indicating their physical nature as signals of detected acoustic energy over time.

The method according to the preferred embodiment of the invention continues in process 34, in which system computer 30 determines the vertical (stacking) velocity $V_v$ for each depth point DP in the gather. As is well known in the art, stacking velocities $V_v$ typically vary with zero-offset time to of the reflection event due to variations in the acoustic velocities over different subsurface strata at the various depths. Accordingly, process 34 preferably derives the vertical velocity $V_v$ for each of the depth points of interest, in the form of a stacking velocity function $V_v(t_0)$ that varies with two-way travel time $t_0$.

According to the preferred embodiment of the invention, process 34 is performed using only near-offset traces in the retrieved CMP gather. For example, process 34 may be performed only upon traces in the retrieved gather having offsets that are below a threshold value, which may be set to a fraction of the zero-offset depth z of the deepest depth point DP of interest, for example at approximately one-half of such a depth z. This near-offset limitation is performed so that only traces corresponding to substantially vertical paths are used in deriving the vertical velocity function $V_v(t_0)$.

According to the preferred embodiment of the invention, process 34 is preferably performed upon the envelope function of each trace, rather than upon the trace itself, to mitigate the effect of phase dispersion over offset. As is well known in the art, the envelope function env{S(t)} of a trace S(t) corresponds to the following definition:

$$\text{env}\{S(t)\} = \sqrt{[S(t)]^2 + [Hi\{S(t)\}]^2}$$

where Hi{S(t)} is the Hilbert transform of the trace S(t). The envelope function is a well-known function used in the analysis of time-varying signals, such as seismic traces. In particular, the envelope function eliminates the effects of phase distortion from the traces in the derivation of the vertical velocity function $V_v(t_0)$ in process 34, such phase distortion being substantial in some instances.

Once the envelope functions are derived and stored by system computer 30, semblance analysis is performed to derive the vertical velocity value $V_v$ for each reflection event in the retrieved gather. This semblance analysis is performed by iteratively applying a trial value of vertical stacking velocity $V_v$ to the Dix equation to generate trial normal moveout corrections $\Delta t_x$ for each of the near-offset traces; the near-offset traces $S(t)$ are then each corrected with the trial NMO correction, and the envelope functions generated for each corrected trace. A semblance value is then calculated for the envelope functions of the corrected traces, and stored in memory. The process is then repeated for incrementally adjusted trial stacking velocities $V_v$ to produce an array of semblance values versus zero-offset two-way time $t_0$ and versus the trial values of stacking velocity $V_v$. A continuous vertical velocity function $V_v(t_0)$ may then be derived by best-fit or spline interpolation of the discrete velocities $V_v$ having the highest semblance value for each reflective event, in the conventional manner. The discrete values of continuous vertical velocity function $V_v(t_0)$ are then stored in memory, such as disk storage device 31, by system computer 30 in connection with the retrieved CMP gather.

Following process 34, system computer 30 performs process 36 to derive a time anistropy value $\hat{\alpha}$ and a velocity anisotropy value $\hat{\beta}$ for one of the reflection events indicated in the CMP gather over the full offset range. Specifically, a depth point $DP_i$ for which the anisotropy values $\hat{\alpha}_i, \hat{\beta}_i$ are to be determined is first selected prior to initiating process 36. As will become apparent from the following description, each depth point corresponding to a reflective event in the survey may exhibit unique anisotropy values from other events represented within the gather, due to variations in the parameters of the corresponding subsurface stratum associated with the depth point. As a result of process 36, system computer 30 will determine anisotropy values $\hat{\alpha}_i, \hat{\beta}_i$ for the reflective event associated with the selected depth point $DP_i$, from which accurate normal moveout corrections may be applied to the seismic signal information within a range of time associated with that reflective event. Attention is now directed to FIG. 5, relative to which process 36 according to the preferred embodiment of the invention will be described in detail for a selected depth point $DP_i$.

Figures 4, 5:
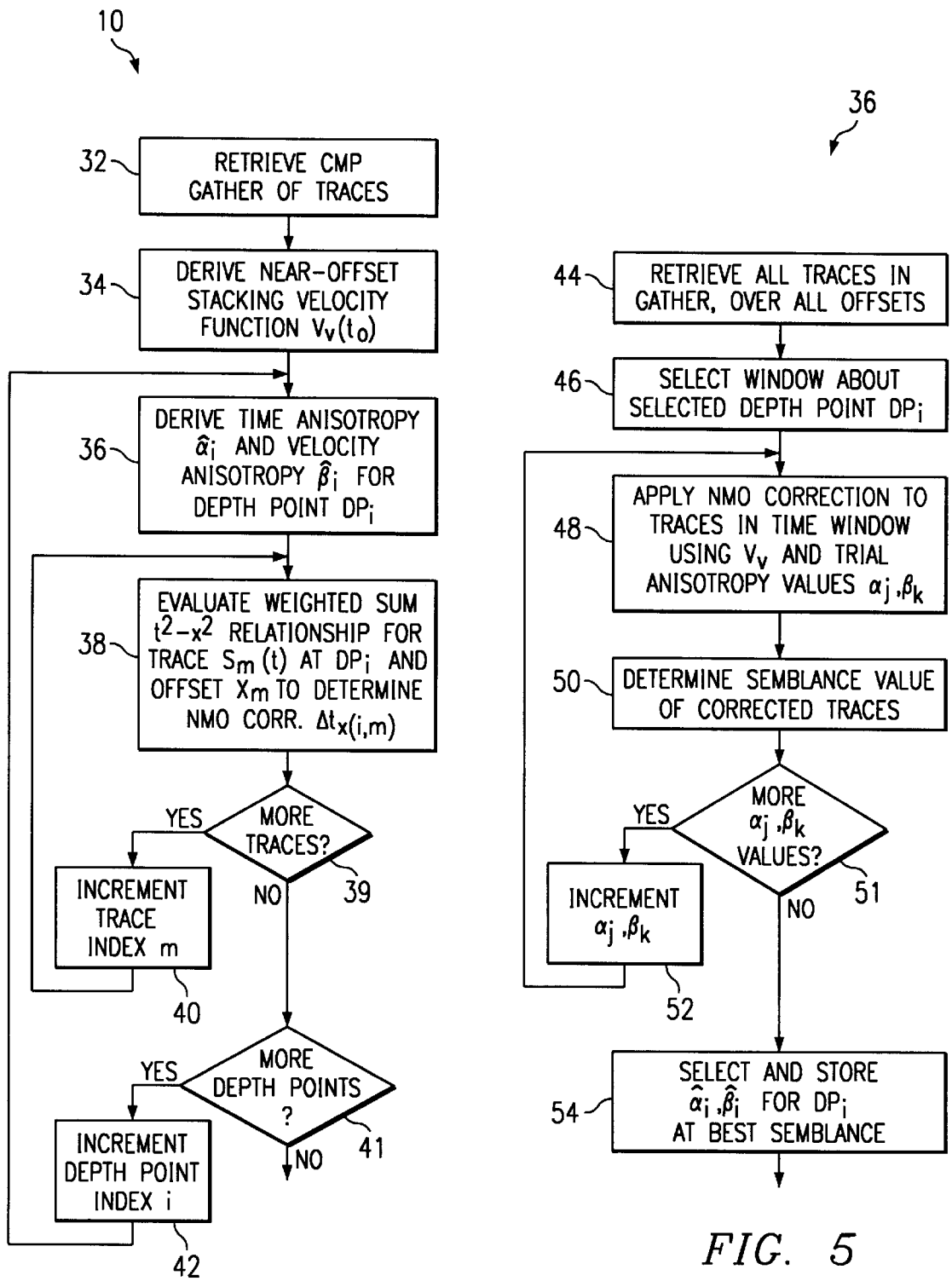
FIG. 4 is a flow chart illustrating the operation of a method of performing normal moveout correction according to the preferred embodiment of the invention.
FIG. 5 is a flow chart illustrating the operation of determining time anisotropy and velocity anisotropy values in the method of FIG. 4 according to the preferred embodiment of the invention.

As illustrated in FIG. 5, the determination of anisotropy factors $\hat{\alpha}_i, \hat{\beta}_i$ begins with process 44 in which system computer 30 retrieves data from memory, such as disk storage device 31. The data retrieved in process 44 corresponds to traces in the CMP gather under analysis over the full range of offsets. In particular, traces from far-offset receivers are included in the retrieval of process 44, considering that time and velocity anisotropy become evident largely in traces corresponding to subsurface paths that have substantial horizontal components. If desired, near-offset traces (i.e., those likely to exhibit little or no anisotropy) may be omitted from the retrieval of process 44.

In process 46, system computer 30 preferably focuses upon a single reflection event, by defining a time window within which each of the retrieved traces evidences a reflection event for a current depth point $DP_i$ of interest. The width, in time, of the window that is selected in process 46 will depend upon the particular attributes of the survey, but will generally be on the order of 20 msec in typical cases. The location of the time window selected in process 46 may vary with offset for the reflective event because of moveout effects.

Following selection of the reflective event time window in process 46, system computer 30 next performs process 48 by way of which normal moveout corrections are applied to the retrieved traces, in the vicinity of the reflective event for the depth point $DP_i$, and using trial values of time anisotropy value $\alpha$ and velocity value $\beta$. The normal moveout correction applied to each trace is based upon the skewed hyperbolic time-offset relationship described hereinabove and thus dependent upon its offset distance x, the vertical stacking velocity $V_v$ at depth point $DP_i$, and upon the trial anisotropy values $\alpha_j, \beta_k$. For example, a normal moveout correction $\Delta t_x(j,k)$ will be derived for a trace $S(t)$ having an offset distance x, using the $j^{th}$ trial time anisotropy value $\alpha_j$, and the $k^{th}$ trial velocity anisotropy value $\beta_k$, according to the following relationship:

$$[t_0 + \Delta t_x(j,k)]^2 = (\alpha_j t_0)^2 + \left[\frac{x}{\beta_k V_v}\right]^2$$

In each pass of process 48, the normal moveout corrections $\Delta t_x(j,k)$ are derived and applied to each trace in the CMP gather that was retrieved in process 44, using the same trial anisotropy values $\alpha_j, \beta_k$.

Upon generation of the set of corrected traces over the selected time window for one pair of trial anisotropy values $\alpha_j, \beta_k$, as performed in process 48, system computer 30 next performs semblance analysis over these corrected traces, in process 50. The semblance analysis of process 50 is performed by generating the envelope functions for each of the trial corrected traces, and by then calculating and storing a semblance value for the envelope functions of the corrected traces, analogously as in the derivation of the stacking velocity described hereinabove. Decision 51 is then performed to determine if additional trial values of trial anisotropy values $\alpha_j, \beta_k$ remain for determination of semblance values, in which case process 52 is performed to increment one (or both) of trial anisotropy values $\alpha_j, \beta_k$ prior to performing the next iteration of processes 48, 50.

Once semblance values have been derived for each desired combination of trial anisotropy values $\alpha_j, \beta_k$ (i.e., decision 51 is NO), process 54 is then performed by system computer 30 to analyze the semblance values derived in the multiple iterations of processes 48, 50, and select the pair of trial anisotropy values $\alpha_j, \beta_k$ that are associated with the best semblance result. These selected anisotropy values are stored in memory by system computer 30 as anisotropy values $\hat{\alpha}_i, \hat{\beta}_i$ for depth point $DP_i$, completing process 36.

Referring back to FIG. 4, process 38 is next performed by system computer 30 to generate the actual weighted sum corrections for the traces in the retrieved CMP gather, at depth point $DP_i$. Process 38 is performed by system computer 30 on a trace-by-trace basis, using the vertical stacking velocity value $V_v$ for depth point $DP_i$ indicated by the stacking velocity function $V_v(t_0)$ in process 34, in combination with the selected time anisotropy value $\hat{\alpha}_i$ and selected velocity anisotropy value $\hat{\beta}_i$ determined in process 36. For a trace $S_m(t)$ having an offset distance of $x_m$, system computer 30 evaluates the NMO time correction value $\Delta t_x(i,m)$ associated with depth point $DP_i$ in process 38 as follows:

$$(t_0 + \Delta_{X(i,m)})^2 = w(x_m)\sqrt{\left(t_0^2 + \left[\frac{x_m}{V_v}\right]^2\right)} + (1 - w(x_m))\sqrt{(\hat{\alpha}_i t_0)^2 + \left[\frac{x_m}{\hat{\beta}_i V_v}\right]^2}$$

As noted above, the weighting function $w(x_m)$ is a monotonically decreasing function ranging from one to zero, and which preferably depends upon the depth z of depth point $DP_i$ and upon the rock properties of the survey region. According to the preferred embodiment of the invention, weighting function w($x_m$) is an exponential function such as the following:

$$w(x) = \exp\left(\frac{-x_m^2}{x_c^2}\right)$$

where $x_c$ is a threshold offset value that varies with the zero-offset depth z of the reflective surface. It is contemplated that one of ordinary skill in the art having reference to this specification and to conventional empirical data and analysis techniques will be readily able to derive an appropriate monotonically decreasing weighting function w($x_m$) and threshold offset $x_c$ (if used) for actual survey regions encountered. The derived normal moveout correction $\Delta t_x$(i, m) is stored by system computer 30 in memory, such as disk storage device 29, either or both as a separate value associated with trace $S_m$(t) and depth point $DP_i$, or by applying the correction $\Delta t_{x(i,m)}$ to trace $S_m$(t).

Decision 39 is then performed to determine if additional traces S(t) in the retrieved CMP gather remain to be analyzed at depth point $DP_i$; if so, the trace index m is incremented in process 40, and process 38 is repeated for the next trace S(t) in the gather, using the same selected anisotropy values $\hat{\alpha}_i,\hat{\beta}_i$ for depth point $DP_i$. Upon all of the traces S(t) in the gather having been corrected at depth point $DP_i$ (decision 39 is NO), control passes to decision 41. Decision 41 determines whether additional depth points remain for analysis and correction within the retrieved CMP gather, in which case (decision 41 is YES) process 42 is performed to increment the depth point index i to advance to the next depth point in the survey. Processes 36, 38, 39, 40 are then repeated to determine the anisotropy values $\hat{\alpha}_i,\hat{\beta}_i$, and to apply the weighted-sum normal moveout corrections to each trace S(t) in the gather, for the next depth point $DP_i$, as described hereinabove. Upon correction of all depth points of interest for all traces in the gather (decision 41 is NO), the normal moveout correction process according to the preferred embodiment of the invention is complete, and the survey is ready for additional processing.

An example of the operation of the preferred embodiment of the invention will now be described relative to FIGS. 6 through 10.

Figure 6:
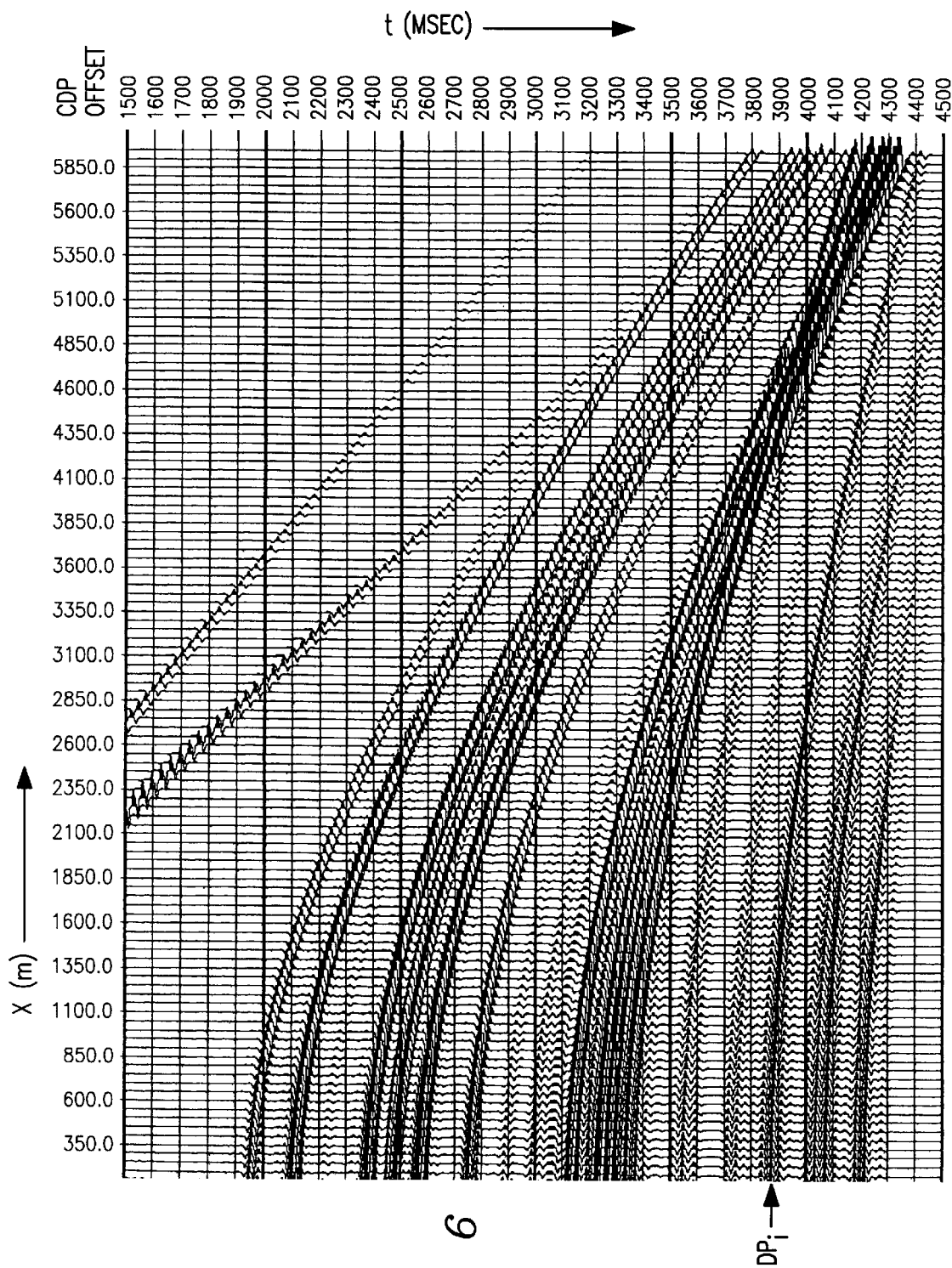
FIG. 6 is a plot of seismic traces from a synthetic VSP survey prior to normal moveout correction, upon which an example of the method according to the preferred embodiment of the invention is applied.

FIG. 6 illustrates a common midpoint (CMP) gather of synthetic well logs modeled upon an actual vertical seismic profiling (VSP) survey, in a survey region in which subsurface strata exhibit transversely isotropic characteristics. In this example, the synthetic traces of FIG. 6 illustrate primaries only, for purposes of clarity. As illustrated in FIG. 6, adjacent traces were obtained at 50 meter spacing, with offsets ranging up to on the order of 6000 meters. As noted above, while the survey of FIG. 6 corresponds to a VSP survey (downhole source to surface receivers) and as such displays the time at which initial energy is received at the surface, it will be understood by those in the art that conventional surface-source surface-receiver surveys provide analogous traces, with the arrival times of energy from various reflective depths dependent upon offset distance in the same manner as that illustrated in FIG. 6. The traces illustrated in FIG. 6 correspond to the traces retrieved from memory in process 32 of FIG. 4.

Figure 7:
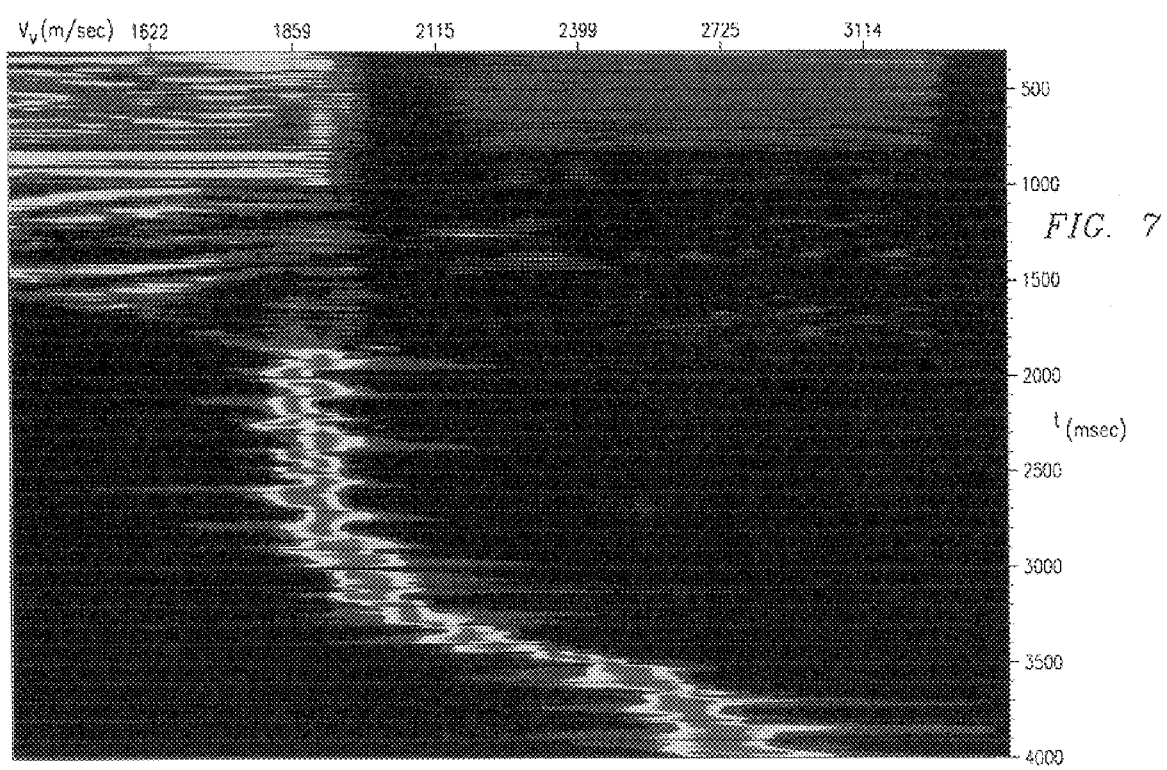
FIG. 7 is a color semblance plot of vertical stacking velocity versus travel time derived according to an example of the method according to the preferred embodiment of the invention.

In this example, as described hereinabove relative to FIG. 4, near-offset traces were used to derive a vertical stacking velocity function $V_v(t_0)$ in process 34. In this particular example, the near-offset traces in the survey of FIG. 6 corresponded to those having offsets on the order of 3000 meters and less. As described hereinabove relative to process 34 of FIG. 4, semblance analysis was used to derive this vertical velocity function $V_v(t_0)$. FIG. 7 illustrates the results of the stacking velocity semblance analysis for near-offset traces as performed in process 34 in this example. In FIG. 7, the color red indicates maximum semblance. As indicated therein, the stacking velocity function $V_v(t_0)$ is relatively constant (at approximately 1900 m/sec) until travel times $t_0$ (which are one-way times in this VSP example) exceed 2800 msec, at which time the stacking velocity $V_v$ increases with increasing depth. Such behavior of vertical stacking velocity $V_v$ is typical for many surveys.

Referring back to FIGS. 4 and 5 as described above, time and velocity anisotropy values $\hat{\alpha}_i,\hat{\beta}_i$ were next derived for a selected depth point $DP_i$, through use of semblance analysis. In this example, the event at 3877 msec $t_0$ (zero-offset travel time) was selected in process 46 as the reflective event $DP_i$, as illustrated in FIG. 6; a time window of approximately 10 msec on either side of this event is selected in this example. As described above relative to process 48, the traces in this exemplary survey were corrected to apply normal moveout correction using multiple sets of trial anisotropy values $\alpha_j$, $\beta_k$, and using the value of vertical stacking velocity $V_v$ at the zero-offset travel time of 3877 msec determined in process 34 (which, in this example, is approximately 2725 m/sec). Normal moveout corrections as a function of offset distance were then applied to traces in the gather over the entire offset range, and over a preselected range of values of trial anisotropy values $\alpha_j$, $\beta_k$.

Figure 8:
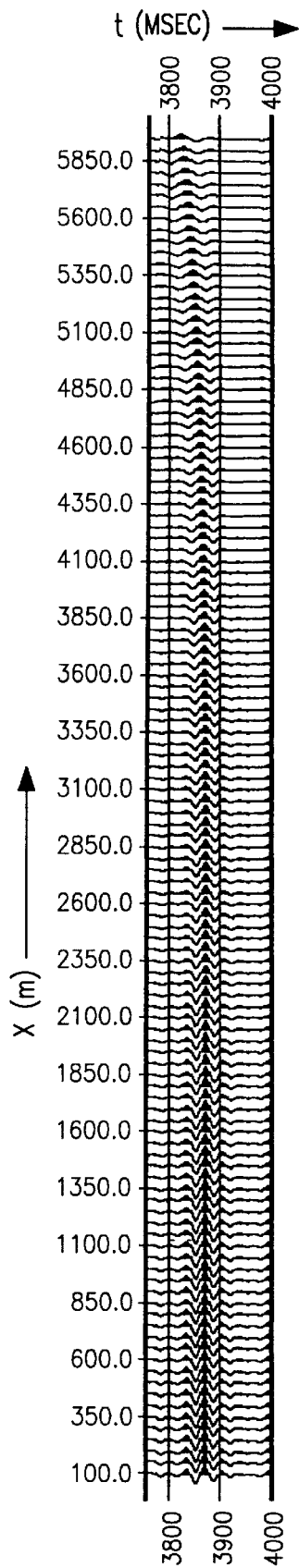
FIG. 8 is a portion of the plot of FIG. 6 illustrating the application of conventional normal moveout correction for a selected reflective event, in an example of the method according to the preferred embodiment of the invention.

FIG. 8 illustrates the results of the set of corrections in process 48 for this example, in the case where both trial anisotropy values $\alpha_j$, $\beta_k$ are unity, which corresponds to the isotropic assumption expressed in the Dix equation. In other words, the correction illustrated in FIG. 8 assumes no anisotropy, and thus illustrates conventional hyperbolic normal moveout correction. As is evident from FIG. 8, conventional Dix equation normal moveout correction tends to overcorrect far-offset traces obtained from survey regions having transversely isotropic behavior.

Figure 9:
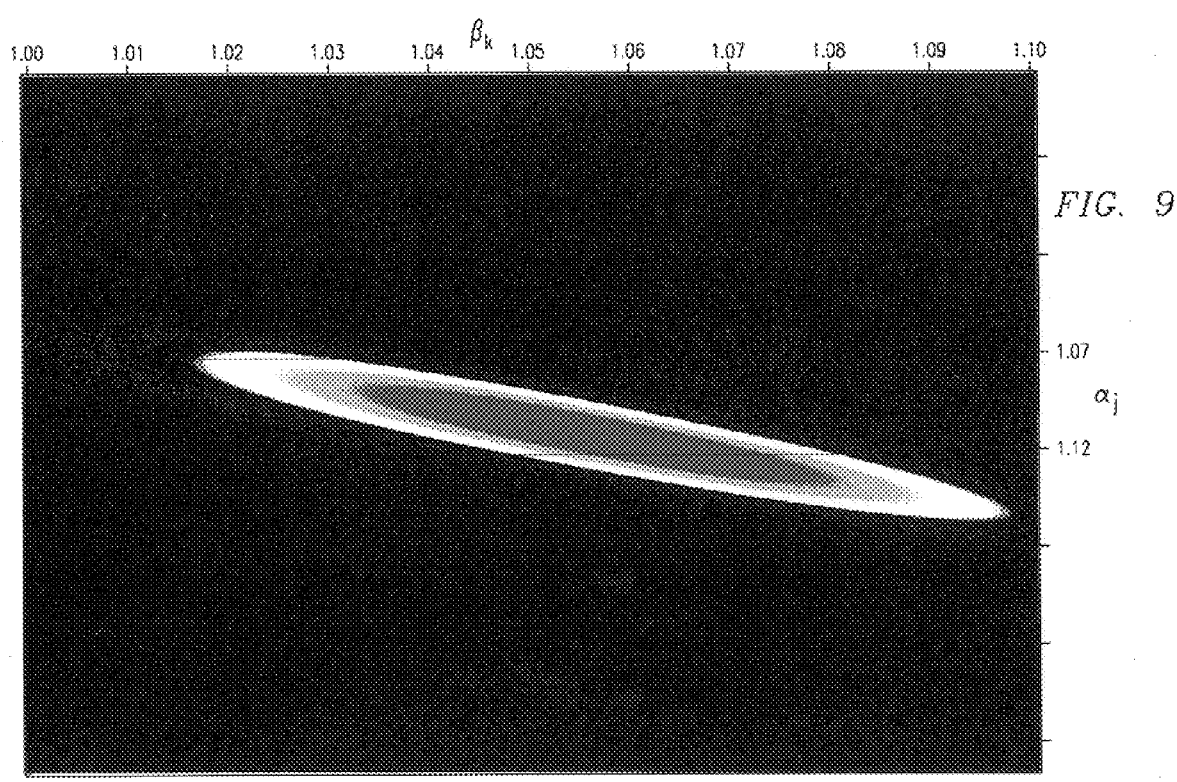
FIG. 9 is a color semblance plot of time anisotropy and velocity anisotropy values for the selected reflection event of FIG. 8 in an example of the method according to the preferred embodiment of the invention.

As described hereinabove relative to FIG. 5, process 48 was repeated for all desired combinations of trial anisotropy values $\alpha_j$, $\beta_k$ over a predetermined range. In this example, trial time anisotropy value $\alpha_j$ ranged from 1.00 to about 1.22, and trial velocity anisotropy value $\beta_k$ ranged from 1.00 to about 1.10. Process 50 then performed a semblance analysis of the envelope functions of each corrected trace, from which the best fit anisotropy factors $\hat{\alpha}_i,\hat{\beta}_i$ exhibited by the corrected traces were determined. FIG. 9 illustrates the results of semblance analysis process 50 upon the corrected traces at the selected depth point $DP_i$ in this example. FIG. 9 is a plot of semblance, indicated by color, as a function of trial time anisotropy value $\alpha_j$ (vertical axis) and trial velocity anisotropy value $\beta_i$ (horizontal axis). Again, the red locations of FIG. 9 correspond to the locations of maximum semblance. For depth point $DP_i$ in this example ($t_0$=3877 msec in the survey of FIG. 6), maximum semblance is obtained at a time anisotropy value $\hat{\alpha}_i$ of 1.01 and a velocity anisotropy value $\hat{\beta}_i$ of 1.05.

Once the anisotropy factors $\hat{\alpha}_i,\hat{\beta}_i$ were determined, normal moveout correction process 38 was performed upon the traces in the retrieved gather for the selected depth point $DP_i$, in process 38 according to the weighted sum method described hereinabove. For the example of FIGS. 6 through 9 and for the values of stacking velocity $V_v$ and anisotropy factors $\hat{\alpha}_i,\hat{\beta}_i$ noted above, an NMO correction was determined for each trace in the gather for depth point $DP_i$ corresponding to a zero-offset travel time of 3877 msec, according to the following relationship:

$$(3.877 + \Delta_{\chi(i,m)})^2 = w(x_m)\sqrt{\left((3.877)^2 + \left[\frac{x_m}{2725}\right]^2\right)} +$$

$$(1 - w(x_m))\sqrt{[(1.01)(3.877)]^2 + \left[\frac{x_m}{(1.05)(2725)}\right]^2}$$

In this example, where depth z to depth point $DP_i$ corresponds to 5282 meters (3.877 sec times 2725 m/sec), threshold offset $x_c$ was set to 6000 feet.

Figure 10:
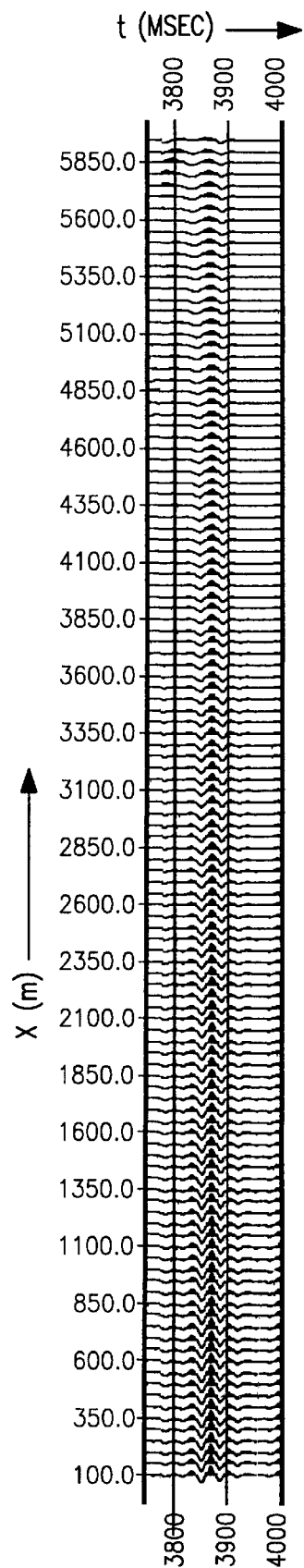
FIG. 10 is a portion of the plot of FIG. 6 illustrating the application of weighted-sum normal moveout correction for the selected reflective event according to the preferred embodiment of the invention.

FIG. 10 illustrates the traces in the gather of FIG. 6, for the depth point $DP_i$ corresponding to zero-offset travel time $t_0$ approximately 3877 msec, after correction according to the weighted sum approach noted above. As is evident in FIG. 10, especially as compared with FIG. 8, normal moveout correction is excellent over the full offset range, as the overcorrection previously observed for far-offset traces (as in FIG. 8) is eliminated.

As is apparent from the foregoing description and example, the preferred embodiment of the invention greatly improves the accuracy with which normal moveout corrections may be applied to seismic signals, particularly for far offset traces obtained in surveys of transversely isotropic media. This improved accuracy improves the ability of additional subsequent processing to identify the location and attributes of subsurface strata in the survey region.

Figure 11:
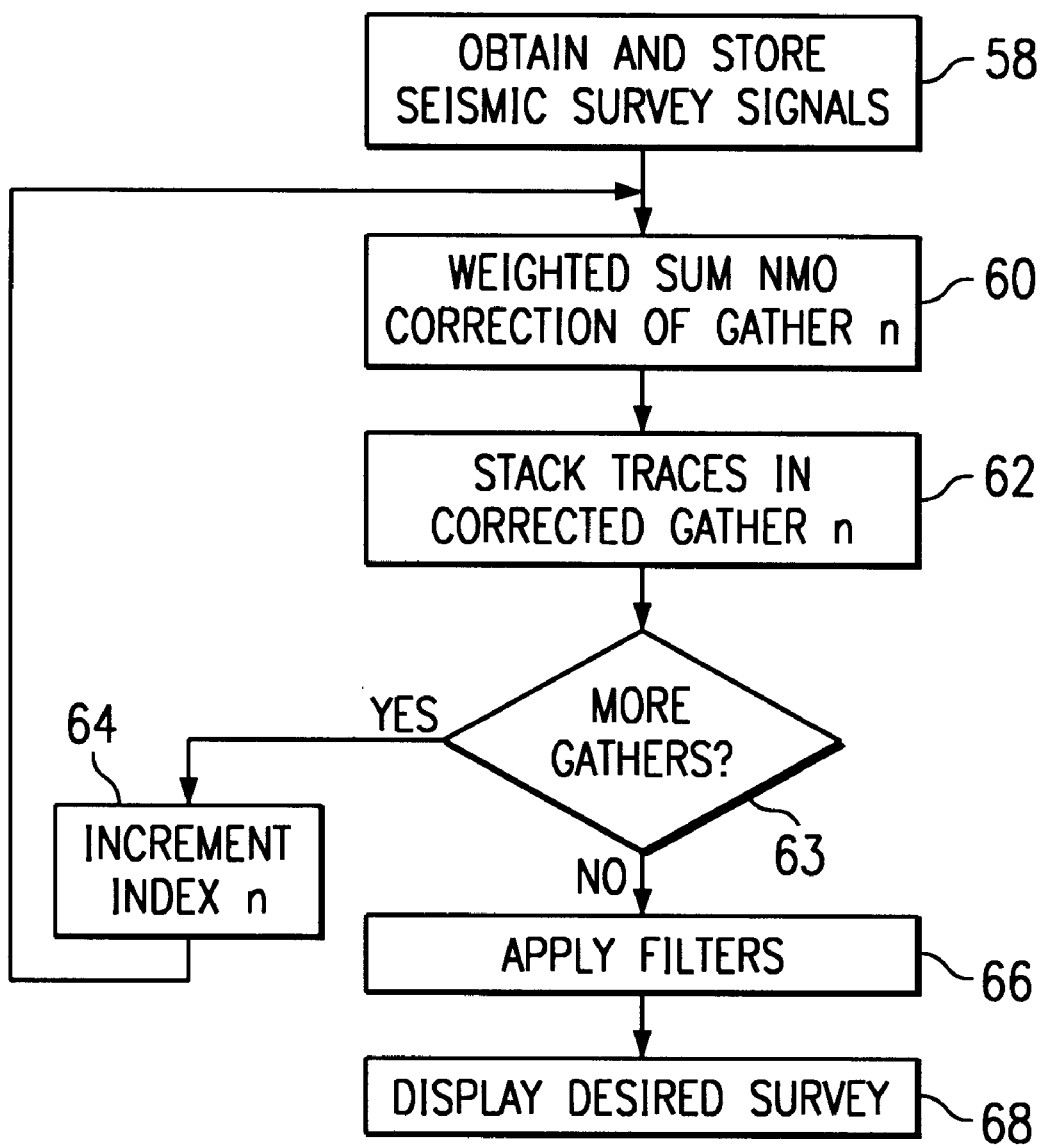
FIG. 11 is a flow chart illustrating the use of the normal moveout correction method of FIG. 4 according to the preferred embodiment of the invention in a conventional surface-deployed seismic survey.

For example, where the seismic survey is performed by way of conventional surface-deployed sources and receivers, as described hereinabove relative to FIG. 1, the normal moveout correction may provide improved seismic survey accuracy in the prospecting context. FIG. 11 illustrates a generalized method of performing a seismic survey including the weighted sum normal moveout correction according to the preferred embodiment, as described above. The method of FIG. 11 may be performed by a computer system as described hereinabove relative to FIG. 3.

According to this method, the survey begins with process 58, in which seismic survey signals are obtained from the survey region and stored by system computer 30 in disk storage device 31. Process 58 may include the actual performing of the seismic survey by deploying seismic receivers in the marine or land-based survey, activating a seismic source at various locations, and recording time-based measurements at the receivers. In this case, system computer 30 will receive signals or data corresponding to the seismic signals from a recording station, and will then store digital data corresponding to these signals in disk storage device 31. Alternatively, considering that the seismic survey signals upon which the method of FIG. 11 is performed can be obtained according to conventional techniques, process 58 may be obtained simply by system computer 30 receiving previously performed seismic survey signals or corresponding data, and loading digital data corresponding to the signals into disk storage device 31.

Following the storage of data corresponding to the seismic survey signals that is performed in process 58, system computer 30 next performs process 60 to determine and apply weighted-sum normal moveout correction to the seismic traces corresponding to a selected common midpoint (CMP) gather (i.e., indicated by the value of an index n) in the survey. According to this embodiment of the invention, process 60 is performed according to the method described hereinabove relative to FIGS. 4 and 5, such that upon completion of process 60, the CMP gather is corrected for normal moveout for each reflective event exhibited in the traces. The weighted-sum normal moveout correction provides the advantages that the normal moveout correction is accurate even for far-offset traces obtained in transversely isotropic survey regions.

Following the weighted-sum normal moveout correction of process 60, the corrected traces in the CMP gather are stacked by system computer 30, in process 62. As known in the art, stacking of traces in a CMP gather substantially corresponds to summation of the traces in the gather. The stacking process serves to reduce the effects of random noise in the survey, considering that the signal portion of the traces will tend to reinforce in stacking and that random noise will tend to cancel. Decision 63 will then be performed to determine if additional gathers remain in the survey to be corrected and stacked; if so (decision 63 is YES), process 64 is performed to increment the value of index n by way of which the CMP gather is identified in the survey. After incrementing process 64, processes 60, 62, 63 are repeated for the next gather The additional processing which now may be performed upon the corrected seismic signals by system computer 30 includes conventional common midpoint stacking, to derive a stacked trace that has significantly reduced noise. As is well known in the art, common midpoint (CMP) or common depth point (CDP) stacking involves the addition of multiple traces having a common midpoint or depth point. Such addition tends to cancel out the effects of random noise, while the signal portion of the traces reinforce one another upon addition.

Upon completion of the normal moveout correction and stacking in all of the gathers in the survey (decision 63 is NO), conventional seismic survey processing may be performed to derive the survey desired by the geologist. In the embodiment of the invention illustrated in FIG. 11, this conventional seismic processing includes the application of filtering processes in process 66; such filtering, both in the post-stack processing and also, optionally, performed prior to correction and stacking, is known in the art. Upon completion of the desired filtering, process 68 is performed by system computer 30 to process the stacked traces into a survey and to display attributes of the survey upon graphics display 27 or printer 28. The survey may also be stored in disk storage device 29 for additional processing, if desired.

In addition to normal moveout correction in seismic surveys, it is contemplated that the anisotropy values $\hat{\alpha}_i, \hat{\beta}_i$ that are determined for each depth point $DP_i$ in each CMP gather of the survey may be used to characterize subsurface formations. For example, it is contemplated that the anisotropy values $\hat{\alpha}_i, \hat{\beta}_i$ may be used to determine lithology types, or to discriminate against or exclude lithology types, primarily in a qualitative sense. In addition, inversion of subsurface parameters from the anisotropy values $\hat{\alpha}_i, \hat{\beta}_i$ can assist in the lithologic interpretation of the seismic stratigraphic sequences.

It is an important advantage of the present invention to provide a method and system for correcting seismic signals for normal moveout in seismic surveys of regions of the earth having subsurface strata with transversely isotropic behavior.

It is a further advantage of the present invention to provide such a method and system which performs such normal moveout corrections in seismic surveys containing far-offset traces.

It is a further advantage of the present invention to provide such a method and system in which sensitivity to measurement errors is much reduced.

It is a further advantage of the present invention to provide such a method and system in which the accuracy of the normal moveout corrections is of sufficient quality that subsurface stiffness parameters may be obtained therefrom.

Other advantages of the present invention will be apparent to those of ordinary skill in the art having reference to the preceding specification together with its drawings.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to correct signals in a seismic survey, comprising the steps of:

retrieving, from computer memory, data corresponding to a first gather of seismic traces, each trace representative of acoustic energy traveling through subsurface geological structures and detected by one of a plurality of receivers deployed near the surface of the earth, each trace in the first gather corresponding to a receiver located at an offset distance;

determining a near-offset stacking velocity of the acoustic energy;

determining first and second anisotropy values for the first common depth point in the first gather of traces, based at least upon traces having offset distances greater than a threshold distance; and determining a normal moveout correction for each seismic trace in the first gather, and associated with the first common depth point, from a weighted sum of first and second offset-dependent normal moveout factors, wherein the first offset- dependent normal moveout factor is dependent upon the near-offset stacking velocity and not dependent upon the first and second anisotropy values and wherein the second offset dependent normal moveout factor is dependent upon the first and second anisotropy values; and storing the normal moveout corrections in the computer memory.

2. The method of claim 1, further comprising:

repeating the steps of determining a near-offset stacking velocity, determining first and second anisotropy values, determining a normal moveout corrections, and storing the normal moveout corrections, for a plurality of common depth points for each seismic trace in the first gather.

3. The method of claim 2, further comprising:

repeating the retrieving, determining, storing, and repeating steps for a plurality of gathers of seismic traces.

4. The method of claim 1, wherein the step of determining a near-offset stacking velocity comprises:

selecting a group of traces having offset distances below the threshold distance; and determining a depth-dependent average stacking velocity function from the selected group of traces.

5. The method of claim 4, wherein the step of determining a near-offset stacking velocity further comprises:

evaluating the depth-dependent average stacking velocity function at the first common depth point.

6. The method of claim 1, wherein the step of determining first and second anisotropy values comprises:

iteratively correcting traces in the first gather at locations near the first common depth point using the near-offset stacking velocity and trial values of the first and second anisotropy values;

after the iteratively correcting step, selecting best fit first and second anisotropy values.

7. The method of claim 6, wherein the step of determining first and second anisotropy values further comprises:

before the selecting step, performing a semblance analysis of the traces corrected in the iteratively correcting step.

8. The method of claim 1, wherein the step of determining a normal moveout correction for each seismic trace comprises:

evaluating a monotonically decreasing function of offset distance, for the offset distance of the seismic trace to determine a weighting factor;

determining the first offset-dependent normal moveout factor as the product of the weighting factor with a first travel time expression based upon the near-offset stacking velocity and not dependent upon the first and second anisotropy values;

determining the second offset-dependent normal moveout factor as the product of an inverse weighting factor with a second travel time expression based upon the near-offset stacking velocity and dependent upon the first and second anisotropy values; and adding the first and second offset-dependent normal moveout factors.

9. The method of claim 8, wherein the first travel time expression corresponds to the Dix equation of travel time as a function of offset.

10. The method of claim 9, wherein the second travel time expression corresponds to a skewed hyperbolic equation of travel time as a function of offset;

wherein the first anisotropy value corresponds to a measure of time anisotropy;

and wherein the second anisotropy value corresponds to a measure of velocity anisotropy.

11. The method of claim 8, wherein the weighting factor is a value between 0 and 1;

and wherein the inverse weighting factor equals 1 minus the weighting factor.

12. The method of claim 8, wherein the value of the monotonically decreasing function varies inverse exponentially with offset distance.

13. The method of claim 1, wherein the seismic traces correspond to reflected acoustic energy detected by the plurality of receivers, the reflected acoustic energy having been imparted into the earth at a plurality of source locations near the earth; and further comprising:

applying the normal moveout correction to each seismic trace in the first gather over a portion of time corresponding to the first common depth point to produce corrected traces in the first gather;

repeating the steps of determining a near-offset stacking velocity, determining first and second anisotropy values, determining a normal moveout corrections, and applying the normal moveout correction, for a plurality of common depth points for each seismic trace in the first gather; and stacking the corrected traces in the first gather.

14. A computer system for correcting seismic survey signals corresponding to acoustic energy traveling through subsurface geological structures and detected by a plurality of receivers deployed near the surface of the earth, comprising:

a computer memory for storing data corresponding to a plurality of traces of seismic survey signals, each trace representative of acoustic energy traveling through subsurface geological structures and detected by one of a plurality of receivers deployed near the surface of the earth; and a system computer, coupled to the computer memory, and programmed to perform the operations of:

retrieving, from computer memory, data corresponding to a first gather of seismic traces, each trace in the first gather corresponding to a receiver located at an offset distance;

determining a near-offset stacking velocity of the acoustic energy;

determining first and second anisotropy values for the first common depth point in the first gather of traces, based at least upon traces in the first gather having offset distances greater than a threshold distance; and determining a normal moveout correction for each seismic trace in the first gather, and associated with the first common depth point, from a weighted sum of first and second offset-dependent normal moveout factors, wherein the first offset- dependent normal moveout factor is dependent upon the near-offset stacking velocity and not dependent upon the first and second anisotropy values and wherein the second offset dependent normal moveout factor is dependent upon the first and second anisotropy values; and storing the normal moveout corrections in the computer memory.

15. The system of claim 14, wherein the seismic traces correspond to reflected acoustic energy detected by the plurality of receivers, the reflected acoustic energy having been imparted into the earth at a plurality of source locations near the earth;

wherein the computer system further comprises an output device, coupled to the system computer, for presenting the corrected seismic survey signals to a human user;

and wherein the system computer is also programmed to perform the operations of:

applying the normal moveout correction to each seismic trace in the first gather over a portion of time corresponding to the first common depth point to produce corrected traces in the first gather;

repeating the steps of determining a near-offset stacking velocity, determining first and second anisotropy values, determining a normal moveout corrections, and applying the normal moveout correction, for a plurality of common depth points for each seismic trace in the first gather;

stacking the corrected traces in the first gather;

repeating the retrieving, determining, applying, stacking, and repeating steps for a plurality of gathers of seismic traces; and outputting a corrected seismic survey, based upon the stacked traces in the plurality of gathers, to the output device.

16. The system of claim 14, wherein the computer is programmed to perform the operation of determining a near-offset stacking velocity by:

selecting a group of traces having offset distances below the threshold distance; and determining a depth-dependent average stacking velocity function from the selected group of traces.

17. The system of claim 16, wherein the system computer is further programmed to perform the operation of determining a near-offset stacking velocity by:

evaluating the depth-dependent average stacking velocity function at the first common depth point.

18. The system of claim 14, wherein the system computer is programmed to perform the operation of determining first and second anisotropy values by:

iteratively correcting traces in the first gather at locations near the first common depth point using the near-offset stacking velocity and trial values of the first and second anisotropy values;

after the iteratively correcting step, performing a semblance analysis of the traces corrected in the iteratively correcting step; and selecting best fit first and second anisotropy values based upon the semblance analysis.

19. The system of claim 14, wherein the computer is programmed to perform the operation of determining a normal moveout correction for each seismic trace by:

evaluating a monotonically decreasing function of offset distance, for the offset distance of the seismic trace to determine a weighting factor;

determining the first offset-dependent normal moveout factor as the product of the weighting factor with a first travel time expression based upon the near-offset stacking velocity and corresponding to the Dix equation of travel time as a function of offset distance;

determining the second offset-dependent normal moveout factor as the product of an inverse weighting factor with a second travel time expression based upon the near-offset stacking velocity and dependent upon the first and second anisotropy values; and adding the first and second offset-dependent normal moveout factors.

20. The system of claim 19, wherein the second travel time expression corresponds to a skewed hyperbolic equation of travel time as a function of offset;

wherein the first anisotropy value corresponds to a measure of time anisotropy;

and wherein the second anisotropy value corresponds to a measure of velocity anisotropy.

21. The system of claim 19, wherein the value of the monotonically decreasing function varies inverse exponentially with offset distance.

* * * * *